Nov. 14, 1933.  V. W. CAMPBELL  1,934,911
WALL FIXTURE
Filed July 26, 1932
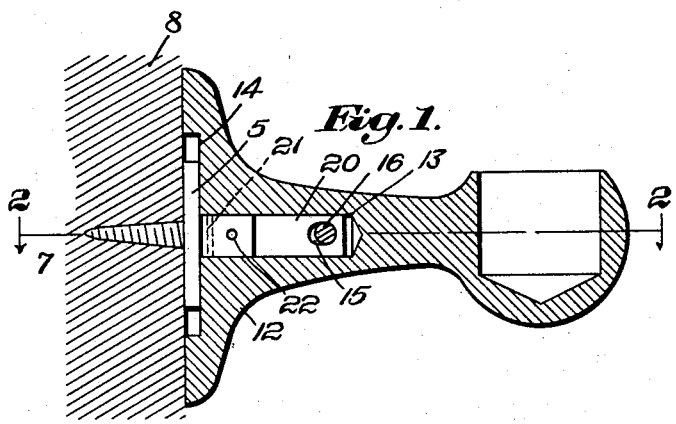
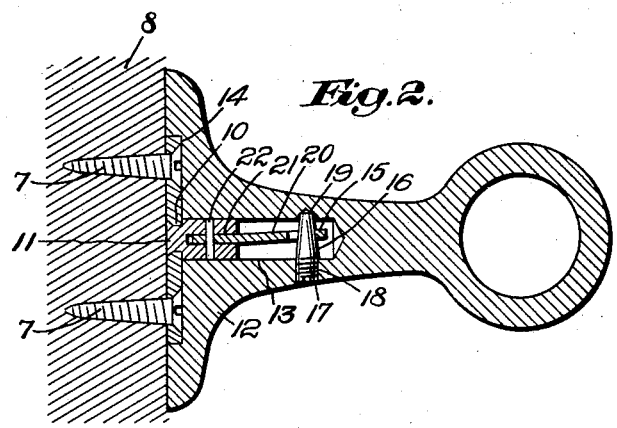
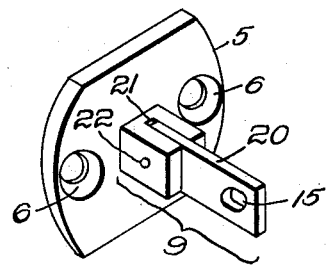
Inventor:
Vernon W. Campbell,
by Emery, Booth, Varney Townsend
Attys.

Patented Nov. 14, 1933

1,934,911

UNITED STATES PATENT OFFICE 1,934,911

WALL FIXTURE

Vernon W. Campbell, Nashua, N. H.

Application July 26, 1932. Serial No. 624,791

8 Claims. (Cl. 248—20)

This invention relates to a novel and improved wall fixture for bath-room and toilet-room accessories, such as towel bars, tooth-brush and tumbler holders, and other devices.

The invention will best be understood by reference to the following description, when taken in connection with the accompanying drawing of one specific embodiment thereof, while its scope will be pointed out more particularly in the appended claims.

In the drawing:

Fig. 1 is a horizontal, longitudinal, sectional view of a wall fixture embodying the invention;

Fig. 2 is a vertical, sectional view, on line 2—2 of Fig. 1; and

Fig. 3 is a perspective view of the base or attaching plate and its stem, or post.

Referring to the drawing, and to the embodiment of the invention illustrated therein, there is shown a wall fixture comprising a base or attaching plate 5, conveniently made of sheet metal, and provided with countersunk holes 6 for the heads of screws 7 to attach the same to a convenient support, such as a wall 8. Projecting from this base-plate is a post or stem 9, conveniently secured to the base-plate, as by providing the post or stem with a reduced portion 10, which is passed through the base-plate, and is headed over or riveted as at 11, to secure the same thereto. A body 12 to be supported is provided with a socket 13 to receive the stem or post, and a shallow recess 14 to receive the base-plate. To prevent the body from turning on the stem or post, the latter, as shown, is in part at least square (see Fig. 3), and the socket is correspondingly shaped.

The stem or post is provided with an aperture 15, extending transversely therethrough to receive a tapered shank 16 of a screw having a body 17 which is received in a threaded opening 18 extending transversely of the socket. Opposite the threaded opening is a shallow depression 19, having tapered sides to receive the inner end of the screw, and to prevent the same from bending or becoming displaced inwardly toward the base-plate. The tapered surface of the screw-shank engages the outer margin of the aperture 15, and as the screw is turned in the proper direction, the tapered surface causes the body 12 to be thrust inwardly toward the wall and the base-plate.

As shown, the stem or post comprises a relatively thin, bendable tongue 20, adapted to bend laterally (see Fig. 2), under the influence of the entering tapered shank of the screw, thereby to shorten the effective distance between the outer margin of the aperture 15 and the base-plate, thus further tending to thrust the body 12 inwardly toward the base-plate. As shown, the tongue 20, instead of being formed as an integral part of the body of the stem or post, is made of a separate piece of sheet metal, received in a slot 21, and held in place therein as by a pin 22. Thus the post or stem is articulated and flexible, and the tongue is capable of a pivotal action about the pin 22 to enable the aperture 15 in the tongue to align itself with the screw, as the latter enters. It should of course be understood that when the fixture is installed, the threaded opening 18 is at the bottom, and that the opening and the screw are concealed from view.

Having thus described one embodiment of the invention, but without limiting myself thereto, what I claim and desire by Letters Patent to secure is:

1. In a wall fixture, the combination of a base for attachment to a support, a post projecting from said base and having an aperture extending transversely therethrough, a member provided with a socket which receives said post, and a threaded opening extending transversely of said socket, and a screw having a threaded body received in said threaded opening and a tapered shank extending through and having its tapered surface engaging the outer margin of said aperture.

2. In a wall fixture, the combination of a base for attachment to a support, a post projecting from said base and comprising a bendable tongue provided with an aperture extending therethrough, a member provided with a socket which receives said post, and a threaded opening extending transversely of said socket, and a screw having a threaded body received in said threaded opening and a tapered shank extending through and having its tapered surface engaging the outer margin of said aperture.

3. In a wall fixture, the combination of a base for attachment to a support, an articulated post projecting from said base and provided with an aperture extending therethrough, a member provided with a socket which receives said post, and a threaded opening extending transversely of said socket, and a screw having a threaded body received in said threaded opening, and a tapered shank extending through and having its tapered surface engaging the outer margin of said aperture.

4. In a wall fixture, the combination of a base for attachment to a support, a flexible post projecting from said base and provided with an aperture extending therethrough, a member provided with a socket which receives said post, and a threaded opening extending transversely of said socket, and a screw having a threaded body received in said threaded opening, and a tapered shank extending through and having its tapered surface engaging the outer margin of said aperture.

5. In a wall fixture, the combination of a base for attachment to a support, a post projecting from said base and having an aperture extending transversely therethrough, a member provided with a socket which receives said post, a threaded opening extending transversely of said socket at one side of the latter, and a depression at the opposite side of said socket in alignment with said threaded opening, and a screw having a threaded body received in said threaded opening and a tapered shank extending through said aperture into said depression.

6. In a wall fixture, the combination of a base for attachment to a support, a post projecting from said base, said post comprising two pivotally connected members, the outer one being provided with an opening, a body having a socket which receives said post, and a fastening element received in said opening and securing said body to said post.

7. In a wall fixture, the combination of a base for attachment to a support, a post projecting from said base, said post comprising two pivotally connected members, the outer one being provided with an opening, a body having a socket which receives said post, and a screw having a threaded portion screwed into said body and a tapered portion received in said opening.

8. In a wall fixture, the combination of a base for attachment to a support, a post projecting from said base, a body provided with a socket which receives said post, said post and said body having cooperating means preventing turning of said body about said post, said post being provided with a transverse opening, and a screw threaded into said body and having a tapered portion engaging the outer margin of said opening.

VERNON W. CAMPBELL.